(12) United States Patent
Herrera et al.

(10) Patent No.: US 12,549,267 B2
(45) Date of Patent: Feb. 10, 2026

(54) ROBOTIC ROAMING TEST SYSTEM (71) Applicant: NETGEAR, Inc., San Jose, CA (US)

(72) Inventors: Bryan Herrera, San Jose, CA (US);
David Mapapa, Santa Clara, CA (US);
Karina Gonzalez, Gilroy, CA (US);
Andrew Patrick Yu, Pleasanton, CA
(US); Mithun Nagesh, Santa Clara, CA
(US); Sreekar Adapa, Richmond (CA);
Henry Chen, Sunnyvale, CA (US)

(73) Assignee: NETGEAR, INC., San Jose, CA (US)

( * ) Notice: Subject to any disclaimer, the term of this patent is extended or adjusted under 35 U.S.C. 154(b) by 334 days.

(21) Appl. No.: 18/468,437

(22) Filed: Sep. 15, 2023

(65) Prior Publication Data
US 2025/0096912 A1 Mar. 20, 2025

(51) Int. Cl.
H04B 17/318 (2015.01)
G05D 1/00 (2006.01)
H04B 17/391 (2015.01)
H04W 24/10 (2009.01)

(52) U.S. Cl.
CPC ......... *H04B 17/318* (2015.01); *G05D 1/0088* (2013.01); *H04B 17/391* (2015.01); *H04W 24/10* (2013.01)

(58) Field of Classification Search
CPC .......................... H04B 17/318; H04B 17/391; H04B 17/3913; G05D 1/0088; H04W 24/10; G06T 15/06; G01J 1/4257; G01J 1/44
See application file for complete search history.

(56) References Cited

U.S. PATENT DOCUMENTS

2021/0367689 A1* 11/2021 Mizugaki ............. H04B 17/391
2024/0284212 A1* 8/2024 Mclean ................ H04W 24/08

* cited by examiner

*Primary Examiner* — Fred A Casca
(74) *Attorney, Agent, or Firm* — PERKINS COIE LLP (57) ABSTRACT A system includes a sensor platform, a motor capable of moving the sensor platform, a set of interfaces to receive messages from a set of mobile computing devices attached to the sensor platform, and a circuitry attached to the sensor platform in communication with the motor. A method may include obtaining a path that traverses a region that receives wireless signals from at least one access point of a plurality of access points and controlling the motor to move the sensor platform along the path. The method may include collecting a set of wireless signal values and determining whether the set of wireless signal values satisfy a set of anomaly criteria at a location of the sensor platform. The method may include stopping the motor at a location associated with the satisfaction of the set of anomaly criteria and storing the location in a set of locations.

20 Claims, 4 Drawing Sheets

ROBOTIC ROAMING TEST SYSTEM

BACKGROUND

Wireless testing environments are commonly used during the development of wireless technology. During such testing operations, a simulated environment may be exposed to one or more access points that may emit or receive wireless signals. A test subject may move through the wireless environment created by these access points with one or more mobile computing devices to test the state of the wireless environment. A full understanding of the state of a wireless environment may be obfuscated by variations in the configuration of the access points, different shapes of rooms or objects in the rooms, the materials used for walls or other objects, etc.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Despite advances in virtual simulations, data collected from actual environments remain a gold standard for wireless equipment testing. By using data collected from actual measurements made by wireless receivers or other sensors measuring a wireless environment, a developer or hardware engineer may collect information that simplified simulations or analytical processes may be unable to provide. However, the frequent changes of a physical environment or the differences in a physical environment may make sufficient data collection for a variety of environment types fundamentally challenging. Furthermore, the use of human intervention in collecting wireless signal values may prove problematic due to inconsistencies in how a human being may walk or carry a testing device. Furthermore, human activity is often ineffective at detecting events in wireless communication operations, such as signal handoff operations that switches a mobile computing device from accessing a network via one access point to accessing the network via a second access point.

Some embodiments described in this disclosure may provide solutions to the issues described above and other issues by using a mobile sensor platform that is adaptable to different wireless environments. In some embodiments, a testing system may include a sensor platform that includes an attached set of sensors, where the set of sensors may be standalone sensors or sensors of one or more mobile computing devices attached to the sensor platform. The testing system may further include a motor capable of moving the sensor platform within a region and a set of interfaces to receive messages from a set of mobile computing devices attached to the sensor platform. The system may further include a circuitry attached to the sensor platform that is in communication with various components of the testing system and may perform various operations.

In some embodiments, a system may perform operations to test a wireless environment and dynamically react to changes in a wireless environment. The system may obtain a path that traverses a region of a physical space that receives wireless signals from a plurality of access points. For example, the system may obtain a path through a building having multiple access points, where regions of the building may be within a communication range of one or more access points. The system may then activate its motor or other control mechanisms to travel the path through the region of the physical space. The system may receive wireless signal values from standalone sensors or mobile computing devices attached to the system, where the mobile computing devices may then communicate with the system via the set of interfaces of the system. These wireless signal values may include direct measurements of a signal, such as a signal power, a signal frequency, etc. A wireless signal value may also include information carried by a wireless signal or set of wireless signals, such as an access point identifier, a media access control (MAC) address of a mobile computing device, etc. Some embodiments may determine whether a set of wireless signal values satisfy a set of anomaly criteria. For example, a set of anomaly criteria may include a criterion that a mobile computing device has performed a handoff operation and has switched from communicating with a first access point to communicating with a second access point. Various other types of criteria are possible. For example, the set of anomaly criteria may include a criterion that a signal power has degraded below a threshold indicative of being outside of the communication range of a wireless communication device.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion," refers to a part of, or the entirety of (i.e., the entire portion), a given item (e.g., data) unless the context clearly dictates otherwise. Furthermore, a "set" may refer to a singular form or a plural form, such as that a "set of items" may refer to one item or a plurality of items.

Figure 1:
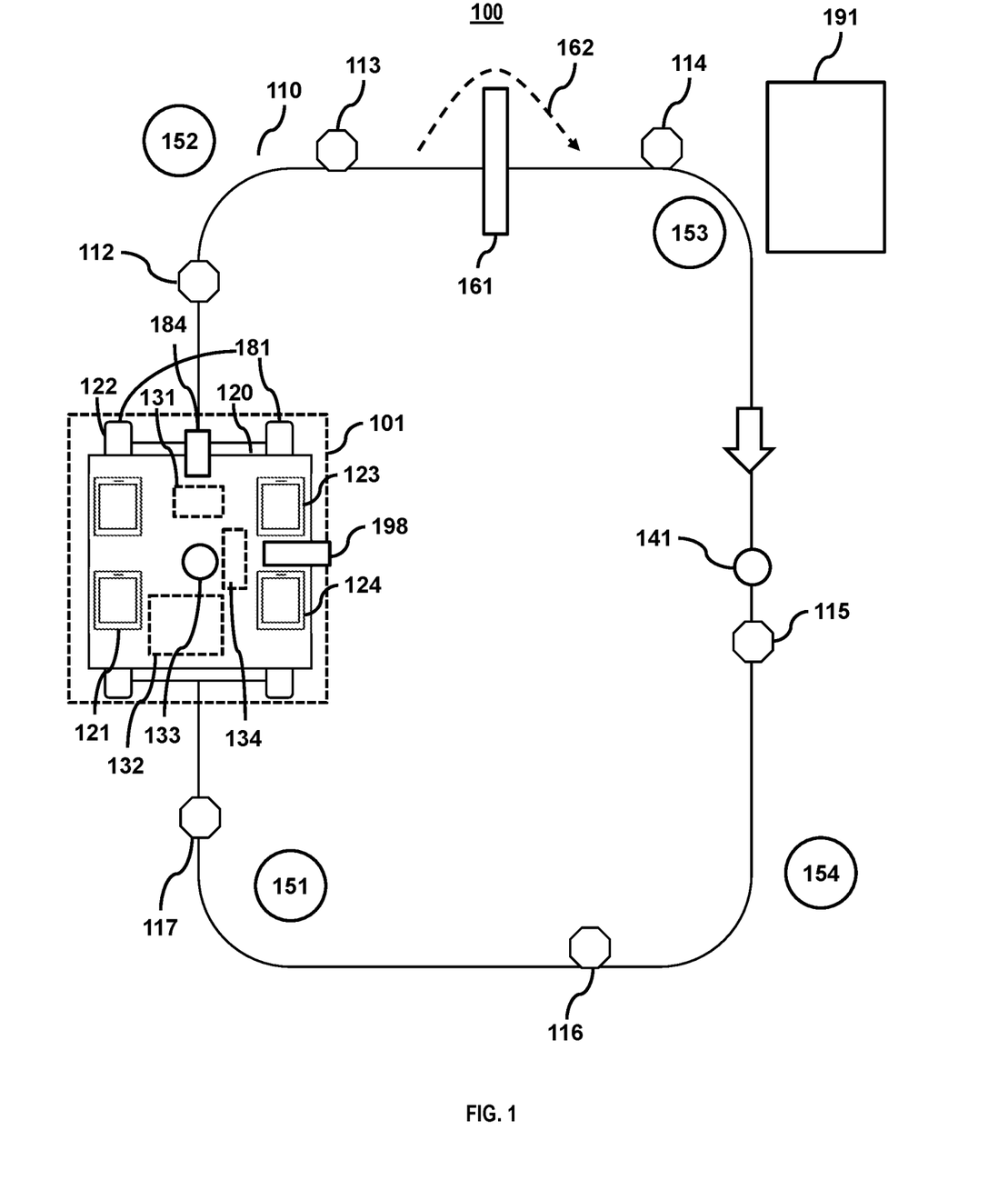
FIG. 1 shows a wireless testing environment system that includes a mobile testing system moving through a wireless environment, in accordance with one or more embodiments.

FIG. 1 shows a wireless testing environment system that includes a mobile testing system moving through a wireless environment, in accordance with one or more embodiments. A wireless testing environment system 100 may include a set of access points 151-154 and a mobile testing system 101. The mobile testing system 101 may include a first motor 131 that, when activated, may move wheels 181 of the mobile testing system 101. The mobile testing system 101 may further include a sensor platform 120 and a set of mobile computing devices 121-124 attached to the sensor platform 120. The set of mobile computing devices 121-124 may include cell phones, laptops, tablets, wearable headsets, other types of wearable devices, etc. The set of mobile computing devices may be connected with a circuitry 132 of the mobile testing system 101, where the circuitry 132 may include a set of processors, memory storage, microcontrollers, wireless communication devices, or other electronic components. The mobile testing system 101 may include an extendable arm 133 capable of moving the sensor platform 120 in a vertical direction. The extendable arm 133 may be adjustable with respect to a base of the mobile testing system 101 and may be moved via a second motor 134 to control the configuration of the extendable arm 133. For example, the extendable arm 133 may be a telescoping arm that extends or retracts in response to motor operations controlled by the circuitry 132, where the extension or retraction may cause a corresponding change in the vertical position of the sensor platform 120.

The mobile testing system 101 may traverse a path 110 through stored path locations 112-117. A stored path location may be used to generate a path. For example, a set of stored path location may be stored as coordinates representing a location in a physical space, where some embodiments may generate a path to intersect each of the stored coordinates. In some embodiments, the circuitry 132 or another computer system 191 of the wireless testing environment system 100 may generate the path 110 based on various types of information. The path 110 may be stored as a set of locations in a vector. In some embodiments, a user may predefine the path 110 by loading the path into a memory of the circuitry 132. In some embodiments, the path 110 may be a visually indicated path in the physical environment through which the sensor platform 120 traverses. For example, the path 110 may be outlined by a visible white line and the sensor platform 120 may include a sensor to follow this visible white line.

Some embodiments may collect wireless signal values of wireless signals sent by the access points 151-154. As the mobile testing system 101 obtains wireless signal values, the mobile testing system 101 may determine whether the collected values satisfy a set of anomaly criteria, where satisfying the anomaly criteria may cause the mobile testing system 101 to modify an operation of the mobile testing system 101. For example, some embodiments may change the motion of the mobile testing system 101 in response to a determination that a set of wireless signal values satisfy a handoff criterion. Some embodiments may change the motion of the mobile testing system 101 by stopping the motor 131 and the sensor platform 120. For example, some embodiments may stop the motor 131 when the mobile testing system 101 is located at the stored path location's second path location 113 for an initial duration. Some embodiments may change the duration for which a mobile testing system 101 remains at a location before moving on. For example, some embodiments may reduce or increase the duration for which the mobile testing system 101 stays at a location to obtain measurements of a handoff event or some other event.

While some embodiments may stop the mobile testing system 101, some embodiments may perform other types of updates to the operation of the mobile testing system 101. For example, some embodiments may slow the motion of the mobile testing system 101 instead of stopping the mobile testing system 101. Furthermore, some embodiments may control the first motor 131 to reverse the mobile testing system 101 and move along a previously traversed portion of the path 110. For example, some embodiments may determine that a set of anomaly criteria is satisfied at the stored path location 115 and, in response, operate the motion of the mobile testing system 101 by controlling the first motor 131 to return to a previously visited location 141. After the mobile testing system 101 returns to the previously visited location 141, the mobile testing system 101 may continue along the path 110 and revisit the stored path location 115. Some embodiments may reduce the velocity of the mobile testing system 101 during a second or otherwise subsequent traversal of the path 110.

Some embodiments may stop at each location of the stored path locations 112-117. For example, the sensor platform 120 may stop at the first path location 112 after moving along the path 110 at a first velocity. Some embodiments may determine that a new location should be stopped at based on a determination that a set of anomaly criteria is satisfied. For example, even if a second path location 113 is not initially a path location of the sensor platform 120, some embodiments may determine that a first mobile computing device 121 has sent a message to the circuitry 132 indicating that a handoff event had occurred. Some embodiments may then stop the sensor platform 120 by stopping the mobile testing system 101. In some embodiments, the path 110 may include multiple loops, where each loop of the multiple loops may be substantially similar in shape. Some embodiments may apply different changes to the operations of the mobile testing system 101 based on which loop of the path 110 that the mobile testing system 101 was traveling. For example, some embodiments may determine whether the mobile testing system 101 was traveling in a first loop of the path 110 or another loop of the path 110. If the mobile testing system 101 was traveling along the path 110 for a first loop, the mobile testing system 101 may stop at the stored path location 112, and if the mobile testing system 101 was traveling along the path 110 for a second loop, the mobile testing system 101 may slow down without stopping at the stored path locations 112.

As used in this disclosure, a first path portion may be substantially similar to a second path portion if both path portions differ by 50% or less in length, share a plurality of intersecting locations, and start and stop at substantially the same location. It should be understood that a first loop may be considered to substantially start and stop at a same place with a second loop if the starting location is within a pre-defined radius of the stored path location. The pre-defined radius may vary based on specific applications and be less than 1 meter (m), less than 2 m, less than 5 m, less than 10 m, less than 25 m, etc.

In some embodiments, the mobile testing system 101 may encounter an obstacle 161 that is in the way of the path 110. The mobile testing system 101 may detect the obstacle 161 by using an optical sensor 184 of sensor platform 120. Alternatively, or additionally, some embodiments may use an optical sensor of a mobile computing device attached to the sensor platform 120, such as the mobile computing devices 121. In some embodiments, the mobile testing system 101 may determine that the obstacle 161 is within a predetermined range of the sensor platform 120 or another component of the sensor platform 120. The predetermined range may be a value less than 10 m, a value less than 5 m, a value less than 1 m, etc. In response to a determination that the object is within the predetermined range of the sensor platform 120, the mobile testing system 101 may perform operations to move around the obstacle 161 by traveling a path portion 162.

Some embodiments may test properties of the obstacle 161 by comparing wireless signals before starting along the path 162 and after starting along the path 162. For example, some embodiments may determine that the first mobile computing device 121 may obtain a first signal measurement based on wireless signals generated by the access point 153 at a first location 135 and a second signal measurement based on wireless signals generated by the access point 153 at a second location 136. Some embodiments may compute a difference between the first and second signal measurements and an estimated difference without the obstacle being present. Some embodiments may then determine a wireless signal blocking property of the obstacle 161 based on the computed difference and the estimated difference.

In some embodiments, the wireless testing environment system 100 may concurrently control operations of the mobile testing system 101 and the access points 151-154. For example, the wireless testing environment system 100 may modify configuration parameters of the first access point 151 while the first mobile computing device 121 moves in a counter clockwise direction. Some embodiments may then determine the effects of changing the access point configuration parameters at different positions along the path 110 by obtaining measurements or other wireless signal values captured or computed by the mobile computing devices 121-124 or a standalone wireless signal sensor 198.

In some embodiments, the mobile testing system 101 may manipulate the extendable arm 133 to change the height of the sensor platform 120. For example, the mobile testing system 101 may move through the path 110 for a first loop while the extendable arm 133 is configured to set the sensor platform 120 at a first height equal to 1.0 m and move through the path 110 for a second loop while the extendable arm 133 is configured to set the sensor platform 120 and a second height equal to 0.8 m. In some embodiments, the mobile testing system 101 may change the height of the sensor platform 120 as the mobile testing system 101 moves along the path 110.

In some embodiments, the information collected by the mobile testing system 101 may include location information indicating where a set of criteria is satisfied. For example, as the mobile testing system 101 travels along the path 110, the mobile testing system 101 may determine that a set of anomaly criteria indicating handoff switches have been satisfied at the stored path location 113, the stored path location 115, and the stored path location 116. Some embodiments may store these path locations in a set of locations, where each location is a location at which a handoff event occurred (handoff location). Some embodiments may then use the set of handoff locations for various types of operations. For example, some embodiments may determine handoff conditions for each of the mobile computing devices 121-124, where different devices may have different handoff profiles. As used in this disclosure, a handoff condition may represent a state of a wireless environment as characterized by a set of wireless signal measurements or other wireless signal values and may be associated with a specific location in the wireless environment.

Figure 2:
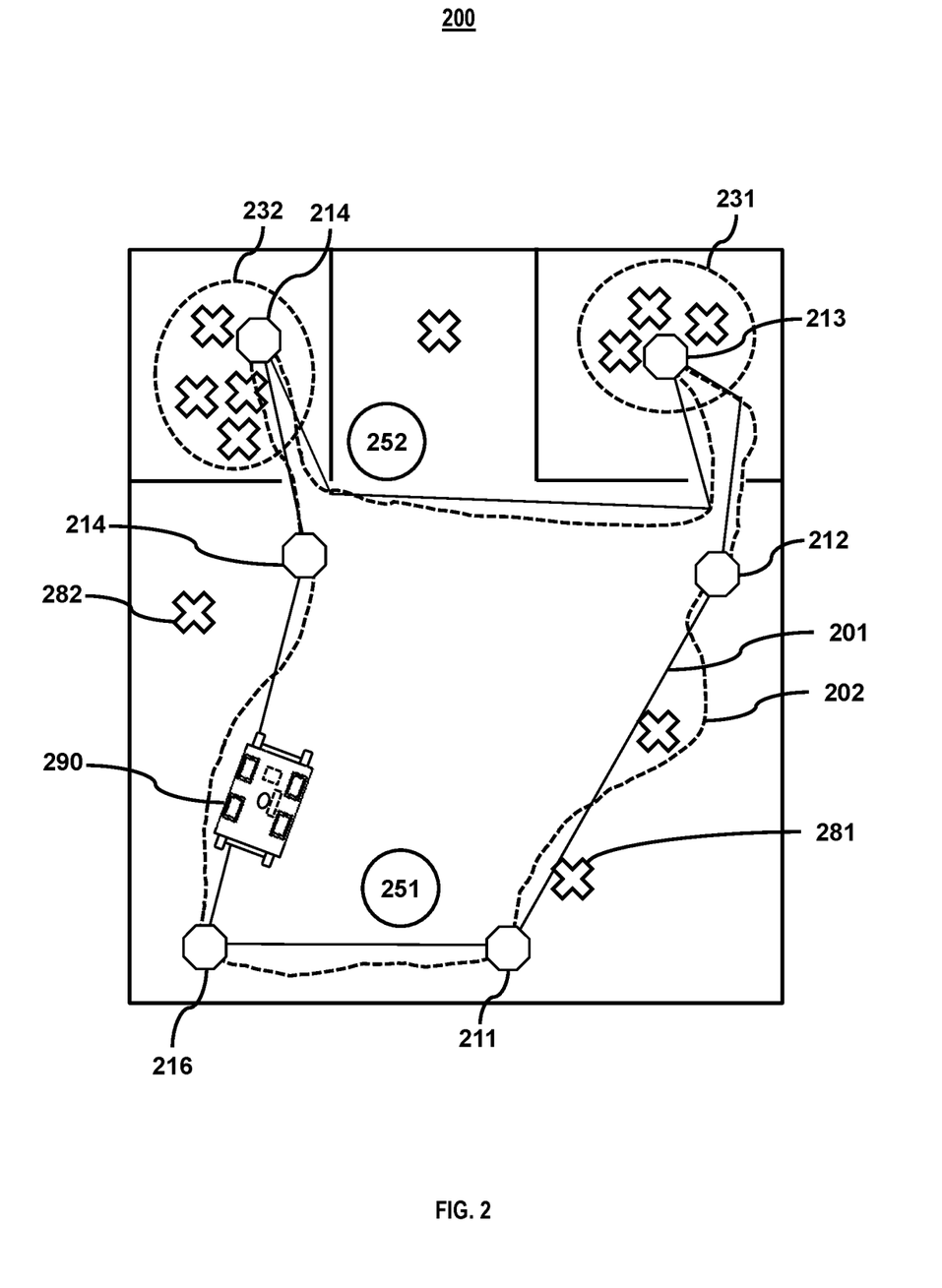
FIG. 2 shows an indoor environment and a system-generated path including multiple loops, in accordance with one or more embodiments.

FIG. 2 shows an indoor environment and a system-generated path including multiple loops, in accordance with one or more embodiments. A wireless environment 200 may include a wireless testing environment system that includes a set of access points, where the set of access points includes a first access point 251, a second access point 252, and a mobile testing system 290. The wireless environment 200 may be mapped and positions in which wireless computing devices have been detected may be incorporated into this map. Some embodiments may use a set of processors of the mobile testing system 290 or another computer system to determine a path that includes a first loop 201 and a second loop 202. Some embodiments may formulate the path such that both loops intersect at the stored path locations 211-216.

Some embodiments may detect positions of mobile computing devices, such as a first location 281, a second location 282, and a set of location clusters that include a first location cluster 231 and a second location cluster 232. Some embodiments determine a first cluster centroid of the first location cluster 231 and set the location of the stored path location 213 as the location of the first cluster centroid. Similarly, some embodiments may determine a second cluster centroid of the second location cluster 232 and set the location of the stored path location 214 as the location of the second cluster centroid. Some embodiments may then generate a path based on the set of cluster centroids by setting some or all of the cluster centroids to be stored path locations that will be intersected by the path.

Some embodiments may also determine one or more stored path locations used to generate a path based on gaps in detected locations of mobile computing devices. For example, some embodiments may determine that there are no wireless signals being communicated by any mobile computing devices in the proximity of the region near the stored path location 216, where a system is not required to have generated stored path location 216 before making such a determination. Some embodiments may then generate the stored path location 216 and add the stored path location to a set of locations that are then used to generate the first loop 201 and the second loop 202.

When generating a path, some embodiments may perturb a first portion of a path to generate a new portion of the path. For example, after generating the first loop 201 of a path, some embodiments may modify portions of the first loop to generate the second loop 202. For example, some embodiments may generate a set of random values using a random or pseudorandom method. Some embodiments may then use the set of random values to move the mobile testing system 290 through the wireless environment 200 such that different portions of the wireless environment 200 may be explored. Furthermore, in some embodiments, the heights of any sensors attached to a sensor platform of the mobile testing system 290 may oscillate or otherwise concurrently change as the mobile testing system 290 moves through the wireless environment 200. By moving the sensors of the mobile testing system 290 along all three axes of a three-dimensional space as the mobile testing system 290 moves through the wireless environment 200, some embodiments may generate a three-dimensional map of wireless signal strength or other wireless measurements of the wireless environment 200.

Some embodiments may generate a path using other types of wireless information. For example, some embodiments may obtain a wireless signal heat map of the wireless environment 200. The wireless signal heat map may be stored as a map of wireless signal strength (e.g., an average signal strength) or another wireless signal property in a two-dimensional or three-dimensional space. Some embodiments may generate a path based on the wireless signal heat map of wireless signals to move between areas of highest wireless signal density to areas of lowest wireless signal density. For example, some embodiments may receive a wireless signal heat map indicating a first subregion that has one or more high power wireless signals passing through the first subregion and a second subregion that has one or more low power wireless signals passing through the second subregion. Some embodiments may select a first location of the first subregion and a second location of the second subregion. Some embodiments may then generate a path that intersects both the first and second locations.

While definitions of high and low power may vary, some embodiments may use a power threshold to define that a signal power is a high signal power or that a signal power is a low signal power. For example, some embodiments may determine that a signal power of a subregion is a region of low signal power if all signals in that region have a signal power less than a power threshold. Alternatively, or additionally, some embodiments may define signal power based on specific types of signals, where different mesh networks may share a common area and a signal power may be associated with a specific mesh network. For example, some embodiments may determine that a first subregion is associated with a high power signal for a first mesh network and is also associated with a low power signal for a second mesh network, where the power threshold may be greater than or equal to 1 decibel-milliwatt (dBm), 10 dBm, 50 dBm, or some other value.

Figure 3:
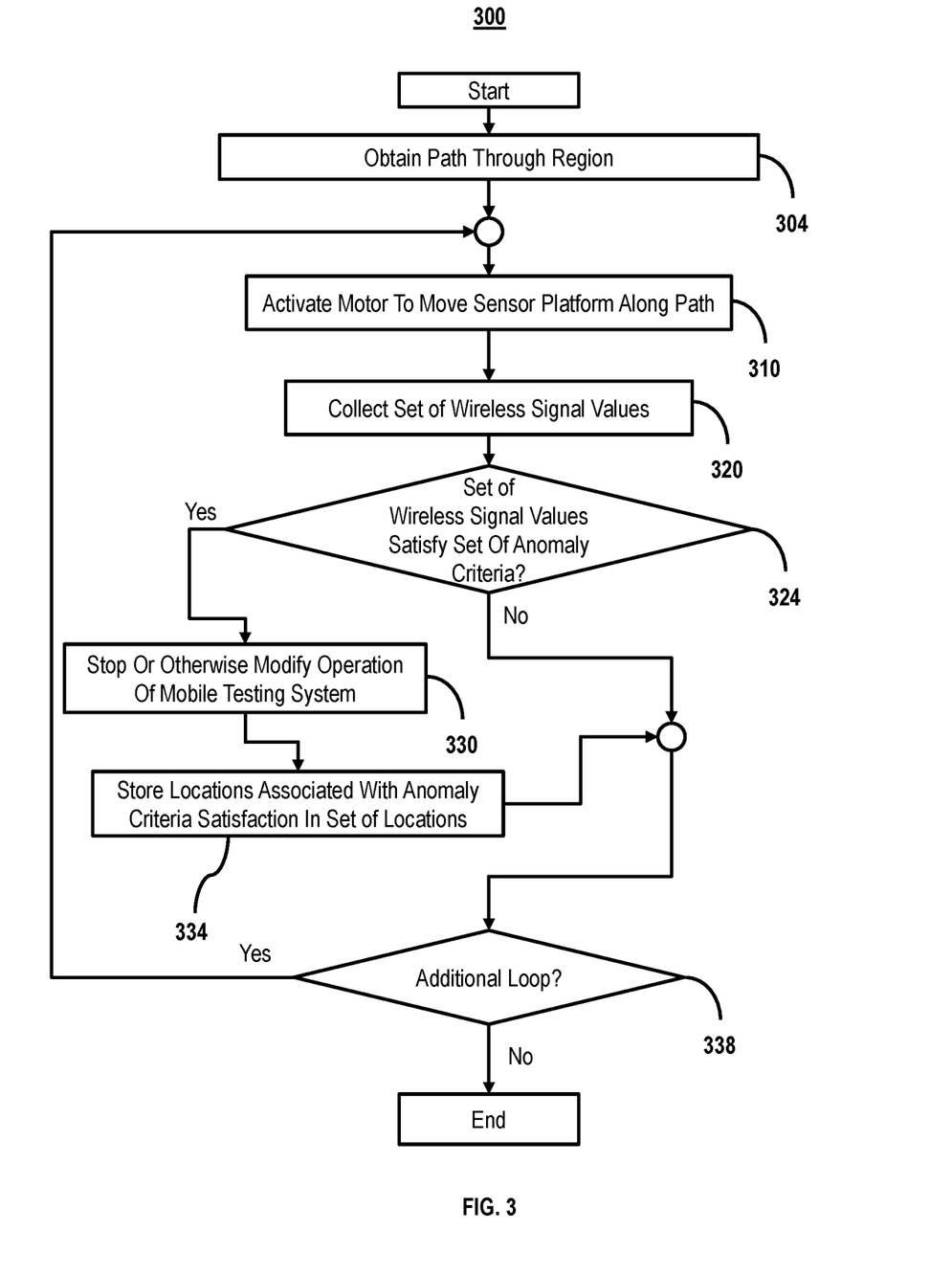
FIG. 3 shows a flowchart of a process to control a wireless testing environment system, in accordance with one or more embodiments.

FIG. 3 shows a flowchart of a process 300 to control a wireless testing environment system, in accordance with one or more embodiments. Some embodiments may obtain a path through a region, as indicated by block 304. In some embodiments, the region through which a mobile testing system traverses may receive wireless signals from one or more access points of a plurality of access points. The path that the mobile testing system takes may be obtained from a user, retrieved from memory, dynamically determined as the mobile testing system is in motion, etc.

Some embodiments may obtain a path by retrieving a pre-construct path from a plurality of paths. For example, some embodiments may select a target path for a mobile testing system to traverse based on a determination that the mobile testing system is in a target initial region, where the target initial region may be associated with the target path in a database or other data structure. For example, some embodiments may determine that a mobile testing system is at a first region and select a first path for the mobile testing system to follow. Some embodiments may then determine that the mobile testing system is at a second region and select a second path for the mobile testing system to follow. By permitting a mobile testing system to retrieve different paths based on different regions, some embodiments may permit a mobile testing system to be adaptable to different environments. Furthermore, some embodiments may retrieve different paths based on an initial subregion of an initial region. For example, some embodiments may determine that a mobile testing system is at a first subregion of a target initial region and, in response, select a first path for the mobile testing system to follow. Some embodiments may later determine that the mobile testing system has been repositioned at a second subregion of the target initial region and, in response, select a second path for the mobile testing system to follow.

Some embodiments may obtain a path by generating or modifying the path. Generating a path may include generating the path based on sensor measurements, values derived from the sensor measurements, a mapping of a region, or other types of information. Some embodiments may generate a path based on known values associated with wireless signals. For example, some embodiments may determine a set of values representing locations of centroids of clusters of wireless mobile computing device locations, where each location of the wireless mobile computing device location may represent a location in which a mobile computing device is detected. Some embodiments may implement a threshold that restricts mobile computing device locations to locations at which a mobile computing device has been present for at least a predetermined duration.

Some embodiments may generate or modify a path based on a map of a region indicating which subregions of the region are passable. For example, some embodiments may obtain a map of a set of rooms in a region and implement a path-building algorithm to visit each room of the region. Some embodiments may use intersecting subregions based on different available information to determine a path for a mobile testing system. The intersecting subregions may represent intersections between passable subregions of a region and gaps in known locations of mobile computing devices. For example, some embodiments may determine a path for a target region by determining that a first subregion of the target region is indicated as passable and also indicated as not having been visited by a set of mobile computing devices. Some embodiments may then generate a path that visits a location of the intersecting subregion. In some embodiments, the location of the intersecting subregion may be selected based on a determination that the location is at a center of the intersecting subregion, is in proximity of another target location to be visited along the path, etc. By including such intersecting subregions in the path of a mobile testing system, some embodiments may ensure that less-visited areas are still being serviced by one or more wireless networks.

Some embodiments may generate or modify a path based on a set of access point locations. For example, some embodiments may access a map indicating known access point locations of a set of access points and further obtain a set of values representing an associated set of ranges for the set of access points. The associated set of ranges may indicate communication ranges for the access points, where the values of the associated set of ranges may represent known effective ranges, ranges obtained from a third-party data source, ranges computed from previous testing operations, etc. Some embodiments may generate a path that intersects regions indicated by the associated set of ranges such that a mobile testing system traveling along the path will be within a communication range of each access point of a plurality of access points.

Some embodiments may activate a motor of a sensor platform along the path, as indicated by block 310. Some embodiments may activate a motor of a mobile testing platform and control the direction of the mobile testing platform based on the path. For example, a mobile testing system may obtain instructions to follow a path indicated by a set of location vectors. Some embodiments may then use the stored path locations to generate a more refined path interpretable by a set of processors of a mobile testing system. Some embodiments may then activate a motor of the mobile testing system to follow the generated path.

Some embodiments may move the sensor platform along the path by moving the mobile testing system. Some embodiments may initiate the motion of the mobile testing system in response to a determination that a set of testing initiation criteria is satisfied. For example, some embodiments may implement the use of a mobile testing system in a real world environment by initiating a testing operation at a set of activation times, where the set of activation times may represent a specific time of a day, a week, a month, etc.

Some embodiments may dynamically change a path being followed by the mobile testing system in response to changes in a wireless environment. For example, some embodiments may store a history of previously detected access points, where the history of previously detected access points may include identifiers of the access points, locations at which communication from the access points was detected, times at which the communication was detected, etc. Some embodiments may detect that a new access point not in the history of access points was discovered and, in response, modify a path of the mobile testing system to move in the direction of the new access point. Some embodiments may determine the direction of the new access point by following an existing path for a first loop. Some embodiments may then determine an approximate location of the new access point by using triangulation or another positioning algorithm based on wireless signal values collected while the mobile testing system traversed the first loop.

Some embodiments may collect a set of wireless signal values, as indicated by block 320. Some embodiments may collect wireless signal values in the form of a set of wireless signal measurements, where a wireless signal measurement may characterize a physical property of a wireless signal. For example, some embodiments may obtain a power value such as a reference signal received power (RSRP) measurement, a frequency, etc. For example, some embodiments may measure RSRP values using standalone sensors attached to a sensor platform of a mobile testing system.

Alternatively, or additionally, some embodiments may collect wireless signal values derived from wireless signal measurements or conveyed via a wireless signal. For example, some embodiments may obtain wireless signal values in the form of information encoded in an associated wireless signal. For example, some embodiments may collect wireless communication via a set of mobile computing devices that then may output a set of values indicating one or more types of information. In some embodiments, the information outputted by a mobile computing device may include information indicating that a signal handoff has occurred. Alternatively, or additionally, some embodiments may collect other types of information derived from a set of wireless signal measurements, such as a MAC address or another type of access point identifier.

Some embodiments may move a sensor platform used to collect wireless signal data in a vertical direction while also moving the sensor platform in a horizontal direction. For example, a mobile testing system may control a first motor of the mobile testing system to move a sensor platform of the mobile testing system in a horizontal direction, where the first motor controls a set of wheels of the mobile testing system. The mobile testing system may then control a second motor of the mobile testing system to move the sensor platform in a vertical direction, where the second motor may control the extension or retraction of an extendable arm attached to the sensor platform. Some embodiments may perform an oscillating action or other cyclical motion with the extendable arm as the mobile testing system moves through a region along a path. By collecting wireless signal values at different heights, some embodiments may collect information to generate a three-dimensional map of a wireless environment indicating wireless signal properties or other related values.

Some embodiments may be connected to multiple wireless signal sensors, where the wireless signal sensors may include standalone receivers, transmitters, transceivers, or components of attached computing devices. For example, a sensor platform may be connected to a plurality of mobile computing devices, such as cell phones, via a set of interfaces, where the connection may be established over a wired connection or a wireless connection (e.g., local Wifi, Bluetooth, etc.). The sensor platform may collect data from the plurality of mobile computing devices and use a set of known positions of the plurality of mobile computing devices to generate a multidimensional map (e.g., a surface, a volume, etc.) indicating wireless signal strength or other wireless values of a subregion surrounding the sensor platform. For example, some embodiments may collect wireless sensor data from a plurality of wireless sensors distributed in four directions of a mobile sensor platform, where the wireless sensor data may be collected from wireless signals provided by a plurality of access points. Some embodiments may then determine signal strength values for multiple positions surrounding the sensor platform, where the signal strength values and associated positions may be used to form a multidimensional map of a wireless environment. For example, some embodiments may generate a surface based on the signal strength values collected by a plurality of sensors, where the surface includes three elements representing a position in a three-dimensional space and at least one additional element representing a wireless signal value.

Some embodiments may collect data from a mobile computing device on a sensor platform without requiring a physical attachment or direct data connection between a mobile computing device and circuitry of the mobile testing system. For example, a mobile computing device positioned on a sensor platform may execute an application to collect wireless signal values. The mobile computing device may then store the wireless signal values in local memory for later retrieval. Alternatively, or additionally, the mobile computing device on the sensor platform may send collected data to a remote server or another type of computer system via other wireless signals.

Some embodiments may determine a location of a mobile testing system based on information collected by access points of a wireless environment testing system. Some embodiments may use triangulation or other systems to determine or confirm the location of a mobile testing system. For example, some embodiments may track the position of the mobile testing system or a mobile computing system attached to or otherwise moving with the mobile testing system by using both internal positioning equipment attached to or otherwise moving with the mobile testing system and by using signal measurements received by one or more access points. Some embodiments may forego positioning devices that are attached to or otherwise move with the mobile testing system in favor of determining the location of the mobile testing system using signals measured by the access points. Furthermore, some embodiments may train or calibrate positioning models based on signal measurements collected by access points by comparing the outputs of these positioning models with information collected by onboard positioning devices of a mobile testing system.

Some embodiments may determine whether the set of wireless signal values satisfies a set of anomaly criteria, as indicated by block 324. A set of anomaly criteria may include criterion that, when satisfied, causes a change in the operation of a mobile testing system, an access point, or another component of a wireless testing environment system. Alternatively, or additionally, a set of anomaly criteria may include criterion that, when satisfied, causes a system to flag or otherwise indicate a time or location for which the criterion is satisfied.

In some embodiments, the set of anomaly criteria may include one or more criteria indicating a handoff event. Some embodiments may use wireless signal values collected from sensors or derived from collected data to determine whether a handoff event occurred. For example, some embodiments may receive communication from a mobile computing device exposed to wireless signals from first and second access points. As a mobile testing system moves the mobile computing device through a first location, the mobile computing device may initiate or complete a handoff operation from the first access point to the second access point at the first location. The mobile computing device may indicate the initiation or completion of the handoff operation and the time associated with the initiation or completion of the handoff operation.

Some embodiments may stop or otherwise modify operations of a mobile testing system, as indicated by block 330. Some embodiments may stop a mobile testing system at a location where a set of anomaly criteria is satisfied. For example, a mobile testing system may receive communication from a mobile computing device indicating that the mobile computing device has started performing a handoff operation to switch its network connection from a first access point to a second access point. In response, the mobile testing system may stop moving along a path and store the location of the handoff operation initiation. Alternatively, some embodiments may slow a mobile testing system at the location where a set of anomaly criteria is satisfied.

In some embodiments, the mobile testing system may continue moving after a predetermined duration has elapsed. For example, if a predetermined duration is equal to 30 seconds, the mobile testing system may stop moving for 30 seconds. Once the 30 seconds elapses, the mobile testing system may continue moving along the path. Alternatively, or additionally, some embodiments may slow the mobile testing system for a period of time. Various durations may be used when stopping or changing the speed of a mobile testing system, such as a duration less than or equal to 1 hour, 30 minutes, 10 minutes, 5 minutes, 1 minute, 30 seconds, 10 seconds, 5 seconds, or some other duration.

Some embodiments may store the location associated with the satisfaction of the set of anomaly criteria in a set of locations, as indicated by block 334. Some embodiments may store the location in a set of locations associated with a specific type of anomaly criteria. For example, some embodiments may access a database storing a sequence of locations associated with handoff events. Some embodiments may concurrently store data collected by a sensor or mobile computing device in a memory of a circuitry of a mobile testing system. Alternatively, some embodiments may receive measurements, values, or other data from the sensor or mobile computing device via a set of wireless messages. For example, some embodiments may receive wireless signal data collected by a mobile computing device via a first access point or a second access point, where the mobile computing device may include handoff information indicating a handoff operation that changes the connection of the mobile computing device from the first to the second access point.

Some embodiments may determine whether an additional loop of the path is available, as indicated by block 338. Some embodiments may follow a path that includes multiple loops, where each loop may be the same or different from another loop of the path. For example, some embodiments may follow a path that includes three identical loops, where a mobile testing system may follow each loop of the path and traverse a region along the three identical loops. Alternatively, a first loop of a path may be different from a second loop of the path. For example, some embodiments may generate a second loop by altering segments of the first loop based on a set of random values or may modify a path of the second loop to move closer to a new access point that was not identified by a history of previously discovered access points. Based on a determination that an additional loop is available, some embodiments may return to operations described by block 304 or operations described by block 310. Otherwise, operations of the process 300 may end until a wireless testing system obtains an additional path.

The operations of each method presented in this disclosure are intended to be illustrative and non-limiting. It is contemplated that the operations or descriptions of FIG. 3 may be used with any other embodiment of this disclosure. In addition, the operations and descriptions described in relation to FIG. 3 may be done in alternative orders or in parallel to further the purposes of this disclosure. For example, each of these operations may be performed in any order, in parallel, or simultaneously to reduce lag or increase the speed of a computer system or method. In some embodiments, the methods may be accomplished with one or more additional operations not described, and/or without one or more of the operations discussed. Additionally, the order in which the processing operations of the methods are illustrated (and described below) is not intended to be limiting.

In some embodiments, the operations described in this disclosure may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to program instructions stored electronically on a non-transitory, machine-readable medium, such as an electronic storage medium. The processing devices may include one or more devices configured through hardware, firmware, and/or software to be specifically designed for execution of one or more of the operations of the methods. For example, it should be noted that at least one of the devices or equipment discussed in relation to FIGS. 1 and 2 could be used to perform one or more of the operations in FIG. 3.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

Figure 4:
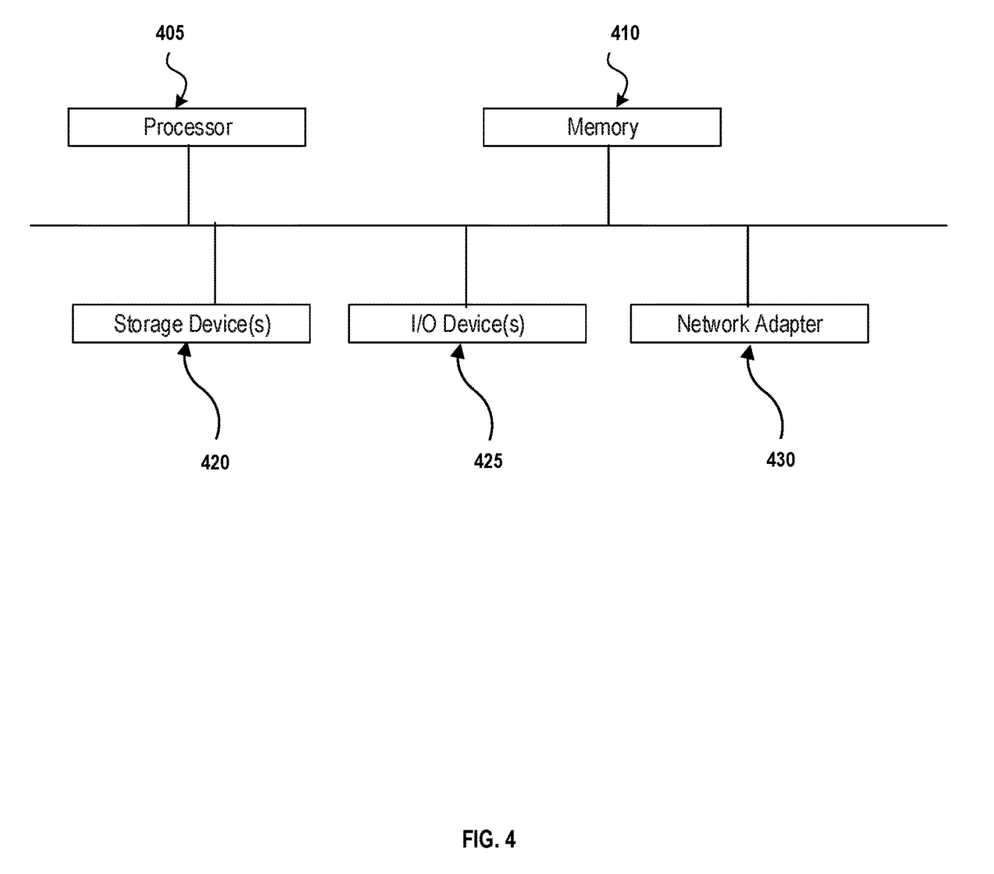
FIG. 4 is a block diagram of a computer system as may be used to implement certain features of some of the embodiments.

FIG. 4 is a block diagram of a computer system as may be used to implement certain features of some of the embodiments. The computer system 400 may include a set of central processing units ("set of processors") 405, memory 410, input/output devices 425, e.g., keyboard and pointing devices, touch devices, display devices, storage devices 420, e.g., disk drives, and network adapters 430, e.g., network interfaces, that are connected to an interconnect 415. The interconnect 415 is illustrated as an abstraction that represents any one or more separate physical buses, point to point connections, or both connected by appropriate bridges, adapters, or controllers. The interconnect 415, therefore, may include, for example, a system bus, a Peripheral Component Interconnect (PCI) bus or PCI-Express bus, a HyperTransport or industry standard architecture (ISA)

bus, a small computer system interface (SCSI) bus, a universal serial bus (USB), an IIC (I2C) bus, or an Institute of Electrical and Electronics Engineers (IEEE) standard 1394 bus, also called FireWire.

The memory 410 and storage devices 420 are computer-readable storage media that may store program instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media may include computer-readable storage media, e.g., non-transitory media, and computer-readable transmission media. For example, the computer readable media may include non-transitory, machine-readable media. While the term "media" is used, it should be understood that a media may include a single medium or a plurality of media.

The program instructions stored in memory 410 can be implemented as software and/or firmware to program the set of processors 405 to carry out actions described above. In some embodiments, such software or firmware may be initially provided to the computer system 400 by downloading it from a remote system through the computer system 400, e.g., via network adapter 430.

The various embodiments introduced herein can be implemented by, for example, programmable circuitry, e.g., one or more microprocessors, programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

With respect to the components of computer devices described in this disclosure, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Further, some or all of the computer devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interfaces nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "an element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps/operations A, B, C, and D) encompass both all such attributes or functions being mapped to all such objects and subsets of the attributes or functions being mapped to subsets of the objects (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y"), in contrast to statements that might be improperly argued to imply sequence limitations (e.g., "performing X on items, performing Y on the X'ed items") used for purposes of making claims more readable rather than specifying sequence. Statements referring to "at least Z of A, B, and C" and the like (e.g., "at least Z of A, B, or C") refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining," or the like refer to actions or processes of a specific apparatus, such as a special purpose computer or a similar special purpose electronic processing/computing device. Furthermore, unless indicated otherwise, updating an item may include generating the item or modifying an existing time. Thus,

What is claimed is:

1. A mobile testing system for testing a wireless environment transmitted by a set of access points and mobile computing devices, the mobile testing system comprising:
a sensor platform;
a motor capable of moving the sensor platform;
a set of interfaces to receive messages from a set of mobile computing devices attached to the sensor platform;
a circuitry attached to the sensor platform in communication with the motor;
a set of non-transitory, machine-readable media storing program instructions that, when executed by the circuitry, performs operations comprising:
obtaining a path that traverses a region of a physical space that receives wireless signals from at least one access point of a plurality of access points;
controlling the motor to move the sensor platform along the path;
collecting, using a wireless receiver, a set of wireless signal values, wherein each wireless signal value is associated with a signal transmitted by an access point of the plurality of access points;
determining whether the set of wireless signal values satisfies a set of anomaly criteria indicating a signal handoff at a location of the sensor platform;
in response to a determination that the set of wireless signal values satisfies the set of anomaly criteria, stopping the motor at a location associated with the signal handoff; and
storing the location in a set of locations indicating handoff locations.

2. The system of claim 1, the operations further comprising:
determining that a first loop of the path has been completed;
generating a set of random values; and
generating a second loop of the path by perturbing a path of the first loop based on the set of random values, wherein the second loop is different from the first loop, and wherein the location associated with the signal handoff is at a position of the second loop.

3. The system of claim 1, wherein:
the path comprises a first loop and a second loop;
the first loop intersects with the second loop at a plurality of locations along the path;
to stop the motor at the location comprises stopping the motor while the sensor platform is moving through the first loop at a first velocity; and
the operations further comprise updating operations of the motor to reduce a velocity of the sensor platform to a second velocity in response to a determination that the sensor platform has reached the location while the sensor platform is being moved through the second loop, wherein the second velocity is slower than the first velocity.

4. The system of claim 1, wherein the path comprises a first loop and a second loop, wherein the first loop and the second loop intersect at a plurality of locations along the path, and wherein:
the sensor platform is configured at a first height while the sensor platform is being moved through the first loop; and
the sensor platform is configured at a second height while the sensor platform is being moved through the second loop.

5. The system of claim 1, the operations further comprising:
obtaining a predetermined range;
receiving a message from an optical sensor attached to the sensor platform indicating an object within the predetermined range of the sensor platform;
determining a first subset of the set of wireless signal values at a first location of the path within the predetermined range of the sensor platform;
moving the sensor platform around the object to a second location of the path;
determining a second subset of the set of wireless signal values at the second location of the path within the predetermined range of the sensor platform; and
determining a signal blocking property associated with the object based on the first subset and the second subset.

6. The system of claim 1, wherein:
the motor is a first motor;
the sensor platform is attached to an extendable arm; and
the operations further comprise moving, with a second motor, the sensor platform in a vertical direction by extending the extendable arm.

7. The system of claim 1, wherein the path comprises a first loop and a second loop, wherein the first loop and the second loop intersect at a plurality of locations along the path, the operations further comprising:
obtaining an initial duration, wherein stopping the motor at the location comprises stopping the motor for the initial duration while the sensor platform is being moved through the first loop;
in response to a determination that the sensor platform has reached the location while the sensor platform is being moved through the second loop, stopping the motor for a second duration, wherein the second duration is less than the initial duration; and
starting the motor after the second duration has elapsed.

8. A method comprising:
obtaining, with a set of processors of a circuitry, a path that traverses a region that receives wireless signals from at least one access point of a plurality of access points;
controlling a motor to move a sensor platform along the path, wherein:
the motor is attached to the sensor platform;
the circuitry control the motor; and
the circuitry is in communication with a set of interfaces to receive messages from a set of mobile computing devices attached to the sensor platform;
collecting, using a wireless receiver, a set of wireless signal values, wherein each signal measurement is associated with a signal transmitted by an access point of the plurality of access points;
determining a result indicating that the set of wireless signal values satisfy a set of anomaly criteria indicating a signal handoff at a location of the sensor platform;
in response to the result indicating that the set of wireless signal values satisfies the set of anomaly criteria, stopping the motor at the location; and
storing the location in a set of locations indicating handoff locations.

9. The method of claim 8, further comprising:
retrieving a history of previously detected access points;
detecting a new access point based on a comparison of identifiers of the plurality of access points and the previously detected access points; and
moving the sensor platform in a direction of the new access point.

10. The method of claim 8, comprising generating a multidimensional map indicating wireless signal strength in response to the result indicating that the set of wireless signal values satisfies the set of anomaly criteria.

11. The method of claim 8, further comprising:
obtaining a wireless signal heat map; and
generating the path based on regions of low signal power indicated by the wireless signal heat map.

12. The method of claim 8, further comprising:
obtaining a set of access point locations of a set of access points and an associated set of ranges indicating communication ranges of the set of access points; and
generating the path based on the set of access point locations, wherein the path intersects with regions indicated by the associated set of ranges.

13. The method of claim 8, further comprising in response to the result indicating that the set of wireless signal values satisfies the set of anomaly criteria, activating the motor to move from a first location of the path to a previously visited location of the path.

14. A set of non-transitory, machine-readable media storing program instructions that, when executed by a circuitry, causes the circuitry to perform operations comprising:
retrieving a path along a physical space, wherein the path traverses a region that receives wireless signals from at least one access point of a plurality of access points;
controlling a motor to move a sensor platform along the path, wherein:
the motor is attached to the sensor platform;
the circuitry control the motor; and
the circuitry is in communication with a set of interfaces to receive messages from a set of mobile computing devices attached to the sensor platform;
collecting, using a wireless receiver, a set of wireless signal values, wherein each signal measurement is associated with a signal transmitted by an access point of the plurality of access points;
determining whether the set of wireless signal values satisfy a set of anomaly criteria at a location;
in response to a determination that the set of wireless signal values satisfies the set of anomaly criteria, stopping the motor at the location; and
storing the location in a set of locations.

15. The set of non-transitory, machine-readable media of claim 14, wherein the region is a target region, the operations further comprising:
obtaining a mapping of the target region indicating a passable subregion;
retrieving a plurality of mobile computing device locations;
determining an intersecting location indicating an intersecting subregion between the passable subregion and a gap in the plurality of mobile computing device locations; and
determining the path based on the intersecting location.

16. The set of non-transitory, machine-readable media of claim 14, the operations further comprising:
receiving a set of activation times; and
initiating the motor to move the sensor platform during each time of the set of activation times.

17. The set of non-transitory, machine-readable media of claim 14, wherein the path is a target path, the operations further comprising:
retrieving a plurality of paths from a memory, wherein the target path of the plurality of paths is associated with a target initial region; and
obtaining the target path based on a determination that the sensor platform is located in the target initial region.

18. The set of non-transitory, machine-readable media of claim 14, wherein the path is a target path, the operations further comprising:
retrieving a plurality of mobile computing device locations;
determining a set of location clusters based on the plurality of mobile computing device locations;
determining a set of cluster centroids based on the set of location clusters; and
generating the path based on the set of cluster centroids.

19. The set of non-transitory, machine-readable media of claim 14, the operations further comprising:
retrieving wireless communication emitted by transmitters attached to the sensor platform; and
determining a position of the sensor platform based on the wireless communication emitted by the transmitters.

20. The set of non-transitory, machine-readable media of claim 14, wherein stopping the motor at the location further comprises sending a command via a wireless message, wherein the command causes a target access point of the plurality of access points to update a configuration parameter, and wherein the update to the configuration parameter causes the target access point to increase a wireless connection range of the configuration parameter.

* * * * *